Patented Apr. 13, 1943

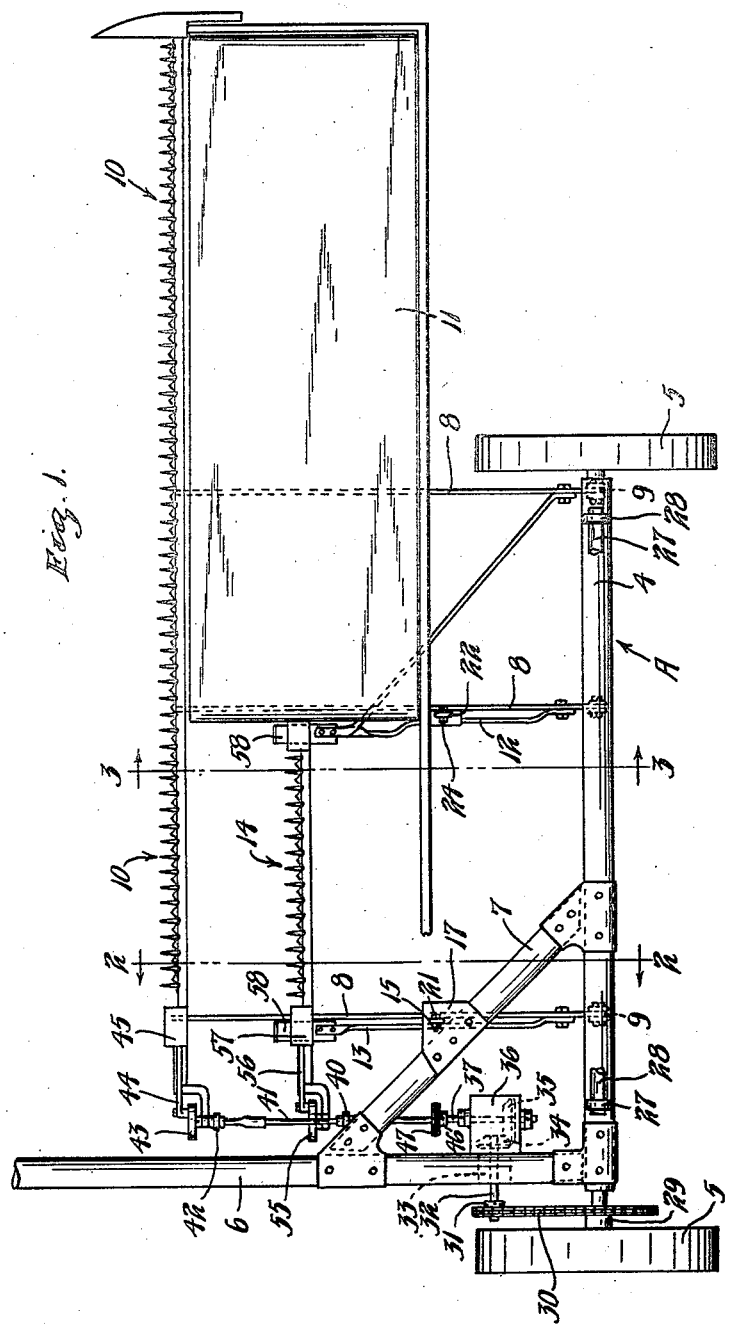

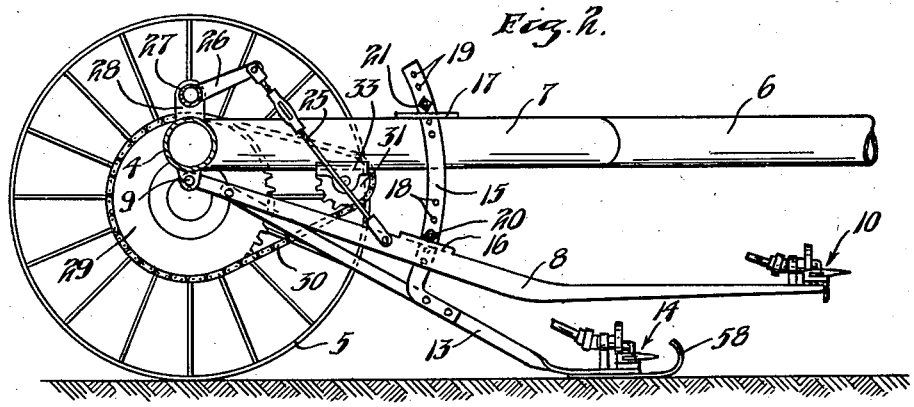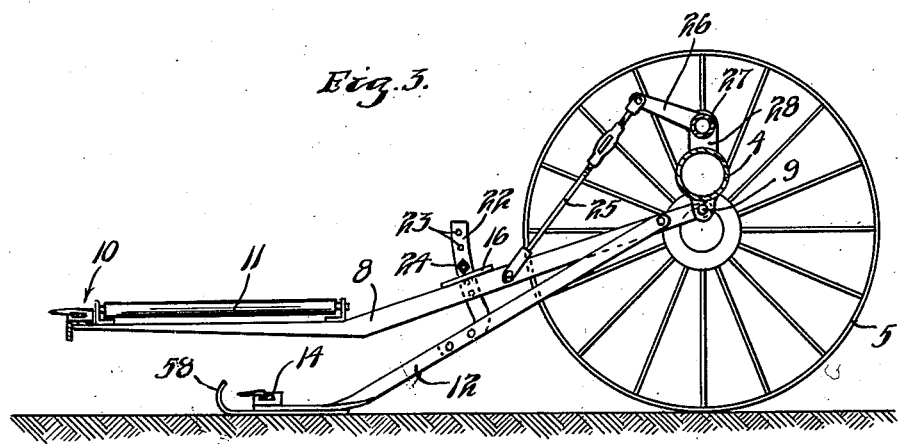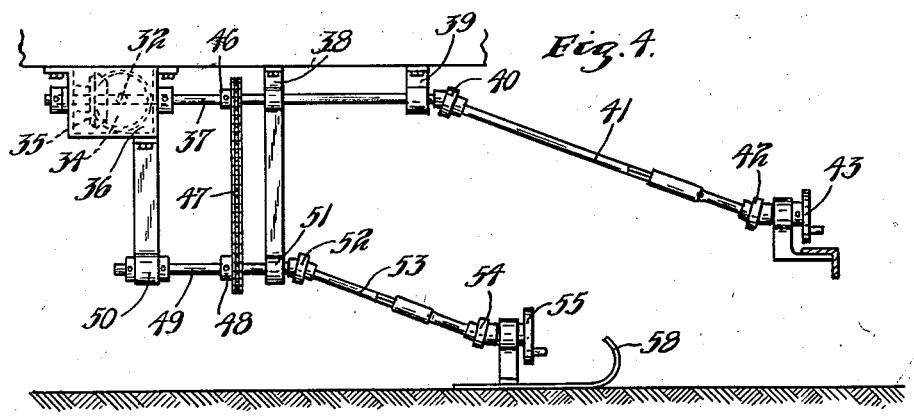

2,316,475

UNITED STATES PATENT OFFICE 2,316,475

UNDERCUT SICKLE FOR WINDROWERS

Peter Casper Viken, Roseau, Minn.

Application February 26, 1942, Serial No. 432,379

5 Claims. (Cl. 56—23)

This invention relates to windrowers.

Grain crops are frequently cut and placed in windrows after which they are picked up by combines or other harvesting machines. When the windrow is laid on high stubble which is at a uniform level it is easily blown about by the wind and the grain is scattered, a great deal of it being blown aside and other portions falling down through the stubble to the ground. Attachments for windrowers have been devised whereby a portion of the stubble is cut short while cutting one swath and a windrow is laid in the short cut strip of stubble when cut in the next succeeding swath. However, such attachments have taken the form of auxiliary sickle bars extending outwardly beside the conventional sickle bar thus adding considerably to the width of the machine. Also the operator of the windrower must be careful to discharge the windrow into the previously cut row of short stubble as well as watch the actual cutting of the grain with the conventional sickle.

It is a general object of my invention to provide a windrower with an under-cut sickle which performs the undercutting operation in the swath where the grain is being cut so that the grain is fed directly from the conveyor of the windrower to the under-cut portion of the same swath which is being topped.

More specifically it is an object of my invention to provide a windrower having a sickle bar and a conveyor belt, the latter discharging at a point spaced inwardly from one end of said sickle bar and also to provide an auxiliary under-cut sickle bar which cuts a relatively narrow swath of short stubble immediately adjacent the discharge end of the conveyor so that the operator need only devote his attention to the actual topping of the grain in the usual cutting operation.

A further object of the invention is to provide an auxiliary under-cut sickle in combination with a conventional sickle wherein the sickles can be raised and lowered simultaneously and wherein the cutting height of the auxiliary undercut sickle can be adjusted relative to that of the main sickle.

These and other objects and advantages of the invention will more fully appear from the following description made in connection with the accompanying drawings, wherein like reference characters refer to the same parts throughout the views, and, in which:

Fig. 1 is a plan view of a windrower embodying my invention;

Fig. 2 is an enlarged section taken approximately on the line 2—2 of Fig. 1;

Fig. 3 is an enlarged section taken approximately on the line 3—3 of Fig. 1; and Fig. 4 is an enlarged fragmentary view of the drive mechanism.

In the drawings there is shown a windrower A having an axle 4 supported by wheels 5. A drawbar 6 extends forwardly from the axle at one end thereof and a brace 7 connects adjacent portions of axle 4 and drawbar 6. A pair of arms 8 which are pivoted to the axle 4 as at 9 extend downwardly and forwardly from said axle 4 and support the main sickle bar indicated generally at 10 and also the crop conveyor 11. The details of the crop conveyor 11 are not shown since they are conventional and well understood in the art and may be constructed similarly to the McCormick Deering windrow harvester shown in the International Harvester Co. catalog MC-D. 2578 of December 19, 1929.

Pivotally secured to the bars 8 are supports 12 and 13 which extend downwardly and forwardly and which have an auxiliary sickle 14 connected therebetween. As best indicated in Figs. 2 and 3, the auxiliary sickle 14 is positioned below and somewhat rearwardly of the main sickle 10. On the left-hand side of the machine, as viewed in Fig. 2, the supporting arm 13 has an upstanding arcuate brace 15 secured thereto. Said brace 15 extends upwardly through an apertured plate 16 on the left-hand main sickle supporting arm 8 and the upper portion of said arcuate brace 15 extends through an apertured plate 17 which is suitably fastened to the diagonal brace 7 connecting the axle 4 and drawbar 6. The arcuate brace 15 is provided with sets of apertures 18 and 19. A bolt 20 is removably positioned in one of the apertures 18 to limit downward movement of the brace 15 relative to the apertured plate 16 and main sickle supporting arm 8. A bolt 21 adjustably positioned in one of the apertures 19 is provided to limit the movement of the brace 15 relative to the main frame element 7. On the auxiliary sickle support 12 is a shorter arcuate brace member 22 having apertures 23 to selectively receive the bolt 24 which functions in the same manner as the bolt 20 in one of the apertures 18 in the brace 15.

As is customary in machines of this general type there are provided links 25 which are pivotally connected at their lower ends to the main sickle supporting bars 8 and at their upper ends to levers 26 on a rotary shaft 27 which is journalled in lugs 28 extending upwardly from the axle 4. As is readily understood in the art partial rotation of the shaft 27 will move the levers 26 and links 25 to raise and lower the main sickle supporting arms 8. Of course, when the arms 8 are raised to the extent where they contact the bolts 20 and 24 on the arcuate braces 15 and 22 the auxiliary sickle 14 will move with the main sickle 10.

The left-hand wheel 5 has a large gear 29 associated therewith for rotation with said wheel. The gear 29 is connected by a chain 30 to a small sprocket 31. Sprocket 31 is mounted on a shaft 32 supported by a bearing 33 on the underside of the drawbar 6, and said shaft 32 carries a bevel gear 34 meshing with a bevel gear 35 in the gear box 36. The bevel gear 35 is mounted on a shaft 37 which extends forwardly of the gear box 36 and is supported by suitable bearing members 38 and 39. The right-hand end of shaft 37 as viewed in Fig. 4 is connected to a universal joint 40 which also connects with a telescoping shaft 41. Said shaft 41 at its lower or right-hand end is connected to a universal joint 42 which in turn is connected to a pitman unit 43. As illustrated in Fig. 1 the pitman 43 is connected by a crank pin 44 to a connector block 45 on one end of the main sickle 10. Of course, rotation of the gears 29 and 31 and the shafts to which they are connected causes reciprocation of the movable element of the sickle 10 in the usual manner.

The drive shaft 37 carries a gear 46 which is connected by a chain 47 to a gear 48 mounted intermediate the ends of a shaft 49 supported by bearings 50 and 51. The universal joint 52 connects the shaft 49 with a telescoping shaft 53 which extends downwardly and forwardly to a universal joint 54 connected to a pitman 55. A connecting rod 56 connects the pitman 55 to the auxiliary sickle 14 at the point 57.

The auxiliary sickle 14 can be carried above the ground level by proper adjustment thereof relative to the main sickle supporting bars 8 or by merely elevating both sickles in the manner described above. However, the auxiliary sickle 14 can be operated substantially in contact with the ground. In such a case the auxiliary sickle 14 would be supported by skids 58 which are mounted on the lower ends of the auxiliary sickle arms 12 and 13. It will be seen in Figs. 2 and 3 that the skids 58 are curved upwardly at their forward ends so that they will ride over the ground without difficulty.

An important advantage of the invention should be noted. When cutting tall or bushy grain with a windrower, the grain must pass through the usual delivery hole and where it is particularly tall the grain will collect at the point of delivery since it will frequently strike the frame. However, with the shorter cut provided by the auxiliary sickle the grain falls closer to the ground and does not clog or come into contact with the frame. This is particularly true when cutting such crops as sweet clover.

From the foregoing description it will be seen that I have provided an under-cut sickle for windrowers wherein a row of short stubble is cut to receive the crop as it is discharged from the conveyor 11, it, of course, being understood that the discharge end of the conveyor is the one adjacent the auxiliary sickle 14, as shown in Fig. 1. As a result deposit of the crop in the row of short stubble is positively provided for since the auxiliary sickle 14 is maintained in definite relation to the discharge end of the conveyor 11. Furthermore, it should be noted that the auxiliary sickle 14 can be raised with the main sickle 10 or its position relative to the ground may be changed independently of that of the main sickle. The adjustment of the sickle is simple and can be quickly made.

It will, of course, be understood that various changes may be made in the form, details, arrangement and proportions of the various parts without departing from the scope of my invention.

What is claimed is:

1. In a windrower, an ambulent frame, a main sickle bar extending across said frame, a conveyor behind said sickle bar having a discharge end adjacent one end of said sickle bar, and an auxiliary sickle bar secured to said frame and positioned at a point below the height of said main sickle bar, said auxiliary sickle bar being further located approximately between the discharge end of said conveyor and a point in tandem rearward alignment with the adjacent end of said main sickle bar.

2. In a windrower, an ambulent frame, a main sickle bar extending laterally from said frame, a conveyor behind said sickle bar and extending longitudinally throughout a substantial portion of said sickle bar, said conveyor having a discharge end adjacent an end of said sickle bar, and an auxiliary sickle bar connected to said frame at a point below the level of said main sickle bar, said auxiliary sickle bar being located in tandem rearward relation to said main sickle bar and between said main sickle bar and that side of said conveyor remote from said sickle bar.

3. In a windrower, an ambulent frame, a main sickle bar extending outwardly from said frame, a crop conveyor extending from one end of said sickle bar toward the other end thereof and terminating a substantial distance from the other end of said sickle bar, and an auxiliary sickle bar positioned below the level of said main sickle bar and extending from said end of said conveyor spaced from said end of said sickle bar to a point substantially in alignment rearward with said end of said main sickle bar.

4. The structure in claim 3 and said auxiliary sickle bar being adjustable in height relative to said main sickle bar.

5. The structure in claim 3 and said main sickle bar being adjustable in height and said auxiliary sickle bar being movable with said main sickle bar and also being movable independently of said main sickle bar.

PETER CASPER VIKEN.